United States Patent
Morovic et al.

(10) Patent No.: US 10,659,656 B2
(45) Date of Patent: *May 19, 2020

(54) THREE-DIMENSIONAL HALFTONING AREA COVERAGE VECTORS FOR PIXELS IN EACH SLICE OF OBJECT USING SELECTED SUB-MATRIX

(71) Applicant: Hewlett-Packard Development Company, L.P., Spring, TX (US)

(72) Inventors: Peter Morovic, Sant Cugat del Valles (ES); Jan Morovic, London (GB); Jay S. Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,790

(22) Filed: Mar. 11, 2019

(65) Prior Publication Data
US 2019/0238716 A1    Aug. 1, 2019

Related U.S. Application Data

(63) Continuation of application No. 15/520,307, filed as application No. PCT/US2014/062934 on Oct. 29, 2014, now Pat. No. 10,306,106.

(51) Int. Cl.
*H04N 1/405* (2006.01)
*B33Y 50/00* (2015.01)
(Continued)

(52) U.S. Cl.
CPC .............. *H04N 1/405* (2013.01); *B33Y 50/00* (2014.12); *B29C 64/112* (2017.08); *B29C 64/165* (2017.08); *B29C 64/386* (2017.08)

(58) Field of Classification Search
CPC .......... H04N 1/405–4058; H04N 1/52; B33Y 50/00; B33Y 50/02; B29C 64/112; B29C 64/165; B29C 64/386; B29C 64/393
See application file for complete search history.

(56) References Cited

U.S. PATENT DOCUMENTS 7,321,447 B2    1/2008   Kuiper
7,589,868 B2    9/2009   Velde et al.
(Continued)

FOREIGN PATENT DOCUMENTS

CN    1477460 A    2/2004
CN    1663233 A    8/2005
(Continued)

OTHER PUBLICATIONS

Cho, W. et at., "A dithering algorithm for local composition control with th ree-dimensional printing." Computer-aided design 35. 9 2003, pp. 851-867.
(Continued)

*Primary Examiner* — Scott A Rogers
(74) *Attorney, Agent, or Firm* — HP Inc. Patent Department (57) ABSTRACT

According to examples, area coverage vectors for each pixel on each slice of a digital representation of an object may be determined and a two-dimensional halftone matrix including threshold values may be subdivided into a plurality of sub-matrices, each sub-matrix including threshold values of the halftone matrix in a respective value sub-range. In addition, for each of the slices, a sub-matrix of the plurality of sub-matrices may be selected and the area coverage vectors for the pixels in the slice may be halftoned using respective threshold values of the selected sub-matrix.

15 Claims, 4 Drawing Sheets

(51) Int. Cl.
*B29C 64/386* (2017.01)
*B29C 64/165* (2017.01)
*B29C 64/112* (2017.01)

(56) References Cited

U.S. PATENT DOCUMENTS

| | | |
|---|---|---|
| 9,950,516 B1 | 4/2018 | Hsieh |
| 2002/0186414 A1 | 12/2002 | Crossland et al. |
| 2003/0053136 A1 | 3/2003 | Chang |
| 2004/0080078 A1 | 4/2004 | Collins |
| 2005/0259885 A1 | 11/2005 | Yamazaki |
| 2006/0111807 A1 | 5/2006 | Gothait et al. |
| 2006/0279787 A1 | 12/2006 | Li et al. |
| 2012/0106835 A1* | 5/2012 | Bernal ............... H04N 1/4052 382/162 |
| 2017/0246812 A1 | 8/2017 | Morovic et al. |
| 2017/0364316 A1 | 12/2017 | Morovic et al. |
| 2017/0365095 A1 | 12/2017 | Morovic et al. |
| 2018/0001566 A1 | 1/2018 | Morovic et al. |
| 2018/0009168 A1 | 1/2018 | Morovic et al. |
| 2018/0011476 A1* | 1/2018 | Morovic ............... G06F 17/50 |
| 2018/0022021 A1 | 1/2018 | Nagahari |
| 2018/0052447 A1 | 2/2018 | Morovic et al. |
| 2018/0264733 A1* | 9/2018 | Morovic ............... G06F 17/50 |

FOREIGN PATENT DOCUMENTS

| | | |
|---|---|---|
| CN | 103763566 A | 4/2014 |
| JP | 2004122501 A | 4/2004 |

OTHER PUBLICATIONS

International Preliminary Report on Patentability dated May 11, 2017, PCT Patent Application No. PCT/US2014/062934, filed Oct. 29, 2014, The International Bureau of WIPO, 7 pages.

International Search Report and Written Opinion dated Jun. 29, 2015, PCT Patent Application No. PCT/US2014/062934, filed Oct. 29, 2014, Korean Intellectual Property Office, 10 pages.

Lou, Q. et at "Fundamentals of 3D halftoning.", Electronic Publishing, Art istic Imaging, and Digital Typography. Springer Berlin Heidelberg, 1998, pp. 224-239.

Veryovka, et al., "Comprehensive halftoning of 3D scenes." Computer Graph ics Forum. vol. 18. No. 3. Blackwell Publishers Ltd, 1999, pp. 1-8.

Zhou, C. et al., "Three-dimensional digital halftoning for layered manufacturing based on droplets." Transactions of the North American Manufacturing Research Institution of SME 37, 2009, pp. 175-182.

* cited by examiner

THREE-DIMENSIONAL HALFTONING AREA COVERAGE VECTORS FOR PIXELS IN EACH SLICE OF OBJECT USING SELECTED SUB-MATRIX

PRIORITY

This application is a Continuation of commonly assigned and co-pending U.S. patent application Ser. No. 15/520,307, filed Apr. 19, 2017, which is a national stage filing under 35 U.S.C. § 371 of PCT Application Serial Number PCT/US2014/062934, having an international filing date of Oct. 29, 2014, the disclosures of which are hereby incorporated by reference in their entireties.

BACKGROUND

Additive manufacturing or rapid prototyping is a popular process for generating various kinds of three-dimensional (3D) objects including prototypes, replacement parts and working tools. The 3D objects, which are typically described using a digital representation, such as electronic data, are automatically built from a material or a plurality of materials using an additive manufacturing system, such as a 3D printer, which combines a number of printed planar layers together to form the desired object.

The layers are fabricated using various techniques. For example, in fused deposition modelling the layers are produced by extruding drops of material to form individual layers. Some other approaches involve spraying of photopolymer materials, inks or binders onto a build tray in layers, wherein each layer is cured, for example, with UV light. Corresponding ink-based systems may also be referred to as ink-marking+curing systems. The layers correspond to cross-sections of the object being formed. Hence, the printing is performed layer-by-layer, with each layer representing a cross-section of the final desired object. Adjacent printed layers may be adhered to one another in predetermined patterns to build up the desired 3D object.

DETAILED DESCRIPTION

Various examples will be described below.

The present disclosure relates to a method for three-dimensional halftoning, comprising providing a halftone matrix including values, and subdividing the halftone matrix into a plurality of sub-matrices, each sub-matrix including values of the halftone matrix in a respective sub-range. For a current slice of a three-dimensional representation of an object, a sub-matrix of the plurality of sub-matrices of the halftone matrix is selected and the current slice is halftoned using the selected sub-matrix.

Objects are typically represented using continuous values or nearly continuous values, such as floating point numbers, in order to define structure, contours and other material properties of the object. However, additive manufacturing or printing typically is a binary or bi-level process: the process can either deposit material or ink on a given layer to define a discrete structure, or deposit no material or ink to leave the structure void. For sharp contours the discreet approach may be ideal, but if more detailed objects are to be created or even if solid material structures are to be generated, means for creating areas of intermediate density have to be applied, such as halftoning or dithering.

Halftoning is a process known in two-dimensional (2D) printing in which an appropriate fraction of discreet elements or pixels is covered with material or ink so that an average appearance of the elements corresponds to the initial continuous definition for these elements. Halftoning may include thresholding, wherein each pixel value is compared against a fixed threshold, random dithering, wherein each pixel value is compared against a random threshold, or patterning, which, for each input value places a fixed pattern in the output. However, such approaches are limited since they do not take into account the spatial distribution and 3D structure of the generated objects and rather focus on individual layers of the generated object.

Further approaches to halftoning may involve error diffusion techniques, which represent a feedback process that diffuses the quantization error to neighboring pixels. However, also error diffusion techniques only focus on the 2D output and further require a rather costly and strictly sequential processing of the output line-by-line.

The method allows for an application of matrices from the 2D domain for 3D halftoning processing. By subdividing the two-dimensional halftone matrix into a plurality of sub-matrices, which are individually applied for respective slices of the representation, the 2D matrix is effectively extended to three dimensions to better reflect the 3D nature of the object. In contrast to an application of a fixed halftone matrix for each slice, fully or partially complementary sub-matrices are used, such that the patterns of the sub-matrices are alternating from slice to slice. This leads to a better distribution of material and connectivity of subsequent slices in a final printed 3D object.

In additive manufacturing or 3D printing, much like in 2D printing, choices have to be made relating to an amount and location of a material or ink to place in order to achieve a desired result. For example, the amount and location of ink(s) on a layer of powdered material has to be determined. In 2D printing this may be done by halftoning, whereby a certain percentage-level combination of inks or Neugebauer Primaries may be interpreted as a spatial and/or statistical distribution of ink drop states on the 2D substrate. In 3D printing, halftoning preferably has to take into account material properties both in single-material type printing and multi-material (or multi-ink) systems. For example, printed materials may expand and a full coverage may result in too much material being deposited. 3D halftoning may be analogous to 2D halftoning in that for a given structure/material quality as well as a desired color, a certain combination of material/ink drops has to be determined. Hence, the approach according to the present disclosure extends 2D halftoning to 3D applications.

The method further allows for an efficient and speedy computation of halftoning results, since the processing for each individual slice may correspond to 2D processing, but with a halftone matrix having been chosen by taking 3D information into account. The method is highly flexible in that a broad variety of 2D halftone matrices can be applied and extended for processing in 3D. Hence, the approach can be fully parameterized and adapted to individual constraints and requirements of the subsequent additive manufacturing or 3D printing procedure and hardware as well as material/ink properties and desired characteristics of the resulting object, by providing and adapting a desired 2D halftone matrix.

The halftone matrix may be any suitable halftone or threshold matrix as used in 2D halftoning, which may be a dispersed-dot type matrix, such as white-noise or void-and-cluster, or clustered-dot type matrix, such as green-noise, AM-screen like patterns, or others. The values of the halftone matrix may be threshold values. The values may span a range of pre-defined granularity, such as 12-bit integer values ranging from 0 to 4095. However, any other range or granularity, such as integer or floating point numbers of 8-bit, 9-bit, 10-bit, and others, may be used.

The halftone matrix is subdivided into a plurality of sub-matrices, wherein each sub-matrix includes values of a sub-range of the range of the values of the halftone matrix. Hence, a first sub-matrix may only include the values of the halftone matrix in the first sub-range, a second sub-matrix may only include the values of the halftone matrix in a second sub-range and each subsequent sub-matrix may include the values of the halftone matrix in the respective subsequent sub-range. Hence, during processing, the sub-matrices may be shuffled around, yet, a histogram of the sub-matrices may substantially remain the same.

Preferably, the sub-matrices have the same size as the halftone matrix and include values of the halftone matrix in respective value sub-ranges. Hence, the halftone matrix and the plurality of sub-matrices may be all the same size, but may have different locations with their native values of the respective sub-range used at a given slice for halftoning. For example, the halftone matrix may be a 256×256 matrix and each one of the plurality of sub-matrices may be a 256×256 matrix. Accordingly, a 256×256 halftone matrix may be used as if it were a number of matrices of the same size according to the individual value sub-ranges. For each individual sub-matrix a respective portion of the sub-matrix corresponding to the other sub-ranges may be left blank. Even though the halftone matrix and the plurality of sub-matrices have been described with a particular size, other sizes of the halftone matrix and the plurality of sub-matrices are also encompassed, such as 512×512, 1024×1024 and larger or smaller matrices, and the present disclosure is not limited in this regard.

The representation of the object which is to be halftoned may be processed according to coplanar slices of the representation or layers of a subsequent additive manufacturing or 3D printing process. The term "slice" as used throughout this description may refer to planar intersections or cross-sections of a three-dimensional model or representation of the 3D object. The term "layer" may refer to planar intersections or cross-sections of the 3D object which are formed in a respective additive manufacturing or 3D printing process. A slice of the model of the 3D object may correspond to a layer of the 3D object or to a plurality of layers of the 3D object. Also, a layer of the 3D object may correspond to a slice of the model of the 3D object or to a plurality of slices of the model of the 3D object. In addition or as an alternative based on a currently processed layer of the additive manufacturing or 3D printing processing, a corresponding slice of the model of the 3D object may be determined, which may include a computation of the slice based on the model of the 3D object. According to a currently processed slice or layer, one of the sub-matrices may be selected in order to perform the halftoning of the current slice. In particular, adjacent slices may be processed using different and complementary sub-matrices, thereby leading to improved structural properties.

According to one example, a subsequent sub-matrix of the plurality of sub-matrices of the halftone matrix is selected for a subsequent slice and the subsequent slice is halftoned using the subsequent sub-matrix. This selection of sub-matrices for subsequent and any further slices may be performed according to a pre-defined pattern or according to a map or formula for selection of the sub-matrices of the plurality of sub-matrices of the halftone matrix.

In one, example, the plurality of sub-matrices is sequentially arranged according to the sub-ranges. The sequentially arranged sub-matrices may be numbered in order to simplify a selection of the sub-matrices based on a current slice.

In yet another example, said selecting the sub-matrix for the current slice or a subsequent slice or the subsequent slice includes selecting the sub-matrix based on a number of the current slice or subsequent slice modulo a total number of the sub-matrices. Accordingly, the halftone matrix may be subdivided into N sub-matrices of the same size and the number of the currently selected sub-matrix i for a current slice j can be computed as i=j mod N. Hence, a selection of the current sub-matrix may be efficiently performed. The halftone matrix may be subdivided into the plurality of sub-matrices based on any number of sub-ranges, which may be disjoint sub-ranges or overlapping sub-ranges of equal size or different sizes.

According to one example, a range of the values of the halftone matrix is partitioned into a plurality of equal and disjoint sub-ranges. Hence, the sub-ranges of the individual sub-matrices correspond to said equal and disjoint sub-ranges. By defining disjoint sub-ranges, the individual sub-matrices are complementary, which may improve structural properties of a resulting 3D object.

In yet another example, the sub-ranges may be equal and overlapping sub-ranges, for example, according to an overlap value.

Figure 1:
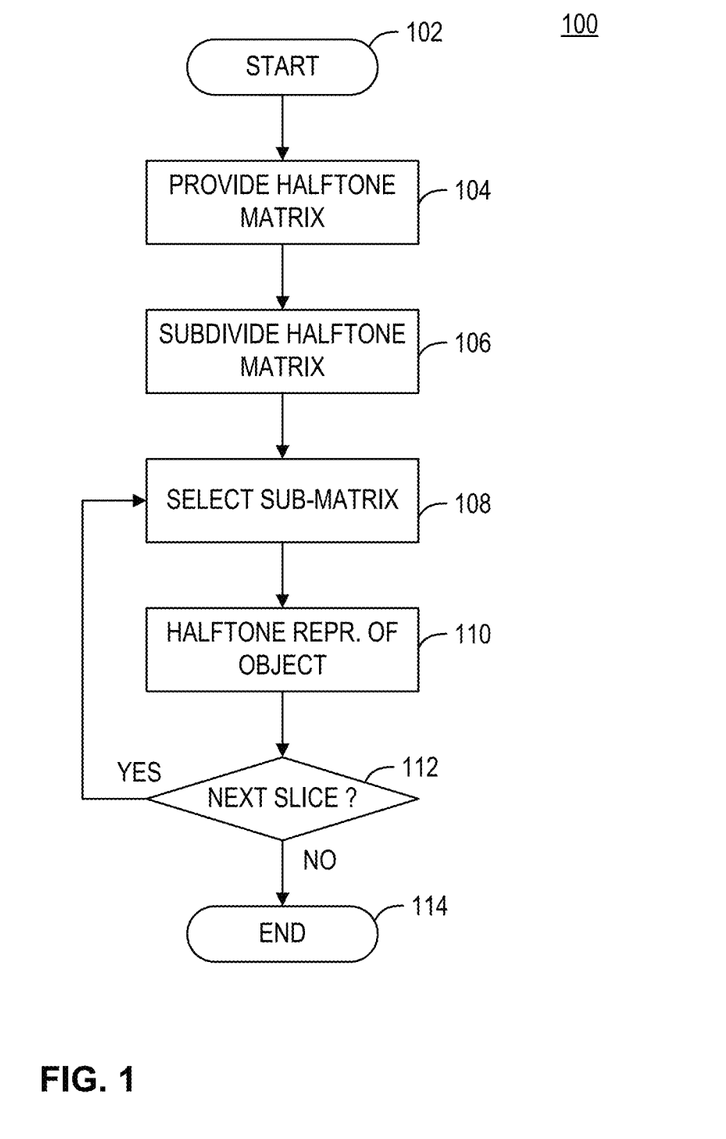
FIG. 1 shows a flow chart of a three-dimensional halftoning method according to one example.

FIG. 1 illustrates a flow chart of a method for three-dimensional halftoning according to one example.

The method 100 may start in item 102 and proceed with item 104, where a halftone matrix including values, such as threshold values, may be provided. In item 106, the halftone matrix may be sub-divided into a plurality of sub-matrices of the same size as the halftone matrix, however, each sub-matrix may include at corresponding locations only values of the halftone matrix in a respective sub-range. For example, the halftone matrix could be sub-divided into (100/N)-percentage sections. For N=10, this would result in a first sub-range of 0%-10% of the values of the halftone matrix for the first sub-matrix, a second sub-range of 10%20% of the values of the halftone matrix for the second sub-matrix, through a tenth sub-range of 90%-100% of the values of the halftone matrix for the tenth sub-matrix. In other words, if for a position (x, y) the respective value of the halftone matrix falls into the first sub-range, the value of the halftone matrix is included into the first sub-matrix at the same position (x, y), if the value falls into the second sub-range, the value is included into the second sub-matrix at position (x, y), and so on, and if the value falls into the tenth sub-range, the value of the halftone matrix at position (x, y) is included into the tenth sub-matrix at position (x, y). The remainder of the first, second, . . . , tenth sub-matrix may be left blank or void.

The method may proceed with item 108 where, for a current slice of a model or digital representation of a 3D object, a sub-matrix of the plurality of sub-matrices of the halftone matrix may be selected, which may be used for halftoning of the current slice in item 110. Accordingly, 3D halftoning may become a combination of values of a representation of the object, such as area coverage vectors for ink(s)/material(s), and a slice sequence number at which the current process is. The method 100 may re-iterate item 108 as long as item 112 determines that there are further slices to be processed.

In the above example, at slice 0 of the halftoning process the first sub-matrix having a sub-range of 0%-10% could be selected, at slice 1 the second sub-matrix having a sub-range of 10%-20% could be selected, up to slice 9, where the tenth sub-matrix having a sub-range of 90%100% could be selected. At slice 10, this may start all over by selecting the first sub-matrix. This corresponds to a tiling of the halftone matrix in a third dimension. However, the method 100 still uses a single 2D halftone matrix to generate the complementary sub-matrices corresponding to the (100/N)-percentage sections. Hence, there may be no overlapping placement, resulting in uniformity of where the material and/or ink is placed in a subsequent additive manufacturing or 3D printing process, which is beneficial for heat dissipation and structural uniformity of the formed 3D object.

If there are no further slices to be processed, the method 100 may end in item 114.

Even though method 100 has been described as a sequence of items, it is to be understood that the respective items may be executed in a different order and that particular items may also be executed concurrently. Furthermore, not all of the items are required in all of the examples described.

In yet another example, the two-dimensional halftone matrix may be optimized based on a diameter of influence of each value. A corresponding optimization approach may analyze the values and structure of the halftone matrix and/or of the sub-matrices and may optimize the halftone matrix in order to ensure that every value on an encoding range (or sub-range) is represented with equal frequency and that it is distributed as uniformly (but not regularly) as possible, given the diameter of influence and a priority of levels, where priority is given to those levels of the matrix that have better properties. In the void-and-cluster case certain levels may have ideal properties while others may deviate from them. For example, a void-and-cluster algorithm can be applied, as described in R. Ulichney: "The void-and-cluster method for dither array generation", Proc. SPIE 1913, pp. 332-343, 1993. The void-and-cluster approach may start at a given level, such as level 0, and may place dots or corresponding values on a grid representing the matrix. Thereafter, placing may be performed at a second level (level 1). Levels may refer to values in the halftone matrix. Hence, an 8-bit matrix may have 255 levels. As the levels increase, depending on the starting level, more or less degrees of freedom are available, such that more or less possibilities exist to generate a uniform (but not regular) pattern or a pattern with a desired characteristic. Typically, a void-and-cluster matrix may have such a desired pattern only on a limited range (or sub-range) of levels.

According to another example, current processing parameters may be determined and the halftone matrix may be optimized based on the current processing parameters. The processing parameters may be processing parameters of an underlying additive manufacturing or printing system and may include information about a configuration of the additive manufacturing or printing system, such as a configuration of a printing head, including a number of nozzles, printing speed or even defects, such as missing or blocked nozzles. For example, some drops of ink or material could be clustered to compensate missing nozzles in the system. The processing parameters may also take into account properties of the processed material(s) and/or ink(s). For example, heat dissipation or material strength can be used as a direct input to a void-and-cluster algorithm to optimize the matrix. For example, these parameters may reflect a size of an area, onto which a single drop of material is deposited or where material/ink is placed, that also gets sufficient heat and/or material strength when dried/cured during the additive manufacturing or 3D printing process. Hence, a 2D halftone matrix may be optimized based on 3D-specific parameters and/or to reflect the current processing parameters. This leads to improved results of additive manufacturing or 3D printing and may even compensate defects of the underlying system.

In yet another example, feedback related to current processing results is received and said representation of the object for a current or subsequent slice is adapted according to the feedback. The feedback may represent a result of a depositing process or printing process using the halftone results and may be used to determine deviations between the actual result and a desired result and in response to this determination, the current representation of the object for a current or a subsequent slice may be adapted in order to improve the results. For example, values of the representation can be adjusted for subsequent slices to reflect variations of a cooling process during printing. Hence, more or less ink and/or material can be added at particular positions to improve material properties and generate an improved representation of the object.

In a further example, material is deposited on a layer according to said halftoning of the slice, preferably, in a 3D printing process. A 3D printer may lay down successive layers of fluid, liquid, or material, such as inks or polymers, to build the object from a series of cross-sections. The layers may correspond to slices or virtual cross-sections from the digital representation or model of the desired object, and may be joined or automatically fused to create the final shape of the 3D object. However, it is to be understood that the 3D halftoning method according to the present disclosure may be used with any other bi-level processing technique which enables a construction of a 3D object in layers based on halftoned slices of the representation of the object.

According to one example, said representation of the object includes a plurality of values for elements of the object on each slice and said halftoning includes thresholding values of the slices using corresponding values of the respective sub-matrix. The elements may be pixels on the respective slice or voxels, which may define ink/material properties at a location of the element. In order to accomplish thresholding, the values of elements are compared with respective threshold values of the sub-matrix, which has been selected for the particular slice in order to decide whether to deposit material at the location of the element on the layer or not.

In yet another example, each value of the representation for an element of the object indicates an amount of respective material to be deposited on the layer at a location of the element. Preferably, said plurality of values corresponds to a plurality of area coverage vectors defined for respective elements of the object. Area coverage vectors may be used to describe a desired area coverage of ink and/or material at each individual element or pixel location within a slice or on a corresponding layer of the printing sequence. In 2D printing, Neugebauer Primaries can be used to define colors as area coverage vectors. Required material properties, which can be constant or variable within a slice as well as across slices, may be represented as respective area coverage vectors. The needed material, whether using an ink-marking+curing technique or a direct material deposition technique as additive manufacturing or 3D printing process, can be expressed as an area coverage vector indicating how much of each material/ink is to be deposited at a given layer of the 3D print. Once the quantities of material/ink are expressed in this way, their distribution is a matter of spatial arrangement of the material/ink, which takes into account additional freedom and constraints pertaining to 3D. For example, for an ink-marking+curing printing approach, an area coverage could be determined as 10% of one drop of a particular ink, for example black, and the area coverage vector could be written as [K1:0.10, W: 0.90], which could be interpreted as 10% of the element being covered in black drops of ink, while 90% of the area is left blank. According to another example, using CMY color inks for 3D printing, an area coverage vector could be defined as [10% Cyan, 5% Cyan and Magenta overprinting, 10% Magenta, 75% blank]. Since in bi-level printing, the area coverage is constant in that either material and/or ink is deposited or not, and, therefore, the amount of material and/or ink deposited at each location is always the same, the area coverage vector could also be interpreted as a probability of the element being printed or not or as a probability distribution of different materials/inks and their combinations to be printed or not. In the former example described above, the element will be covered with material and/or ink with a probability of 0.1 and the element will not be covered with a probability of 0.9.

According to one example, each element on a slice of the representation of the object corresponds to a region of sub-elements to be printed on a corresponding layer. For example, a pixel of the representation of the object on a slice could be printed on k×k sub-pixels, such as 4×4 sub-pixels. However, it is to be understood that any other size and number of sub-pixels can be used to represent a single pixel of the input. This may lead to a better representation of continuous values on the output layers, however, at the cost of an increased resolution.

In a further example, the sub-ranges are overlapping sub-ranges according to an overlap value. This may lead to a loosening of the complementarity requirement for the sub-matrices, since two values of the halftone matrix may be comprised in two or more adjacent sub-matrices. For example, if a uniform 10% coverage for each sub-range and a 2% overlap is defined, then the sub-ranges may be defined as 0%-10%, 8-18%, 16-26% etc.

The present disclosure further relates to an additive manufacturing method for producing an object from a digital representation of the object, said method comprising determining area coverage vectors for each pixel on each slice of the digital representation of the object, and subdividing a two-dimensional halftone matrix including threshold values into a plurality of sequentially arranged sub-matrices, each sub-matrix including threshold values of the halftone matrix in a respective sub-range. For each layer of a sequential manufacturing sequence, the following is performed: determining a slice of the digital representation of the object corresponding to the layer, selecting a sub-matrix of the plurality of sequentially arranged sub-matrices based on a number of the slice modulo a total number of the sequentially arranged sub-matrices, halftoning the area coverage vectors for the slice using respective threshold values of the selected sub-matrix, and depositing material on the layer according to results of said halftoning of the area coverage vectors for the slice.

The additive manufacturing may be performed using 3D printers. Preferably, said depositing material includes depositing a build material and/or printing fluid. Said depositing may also include depositing a plurality of materials and/or a plurality of fluids, such as a plurality of inks.

According to one example, said two-dimensional halftone matrix is a void-and-cluster matrix. The prototyping may be performed based on any 2D halftone matrix, which is subdivided into sub-matrices of the same size as the halftone matrix, however, having only threshold values of the halftone matrix in respective value sub-ranges. Hence, the 2D halftone matrix is tiled to reflect the 3D nature of the additive manufacturing process.

In yet another example, current parameters of the additive manufacturing sequence are determined and at least one of the two-dimensional halftone matrix and the area coverage vectors of the object are optimized for a subsequent slice based on the current processing parameters.

Figure 2:
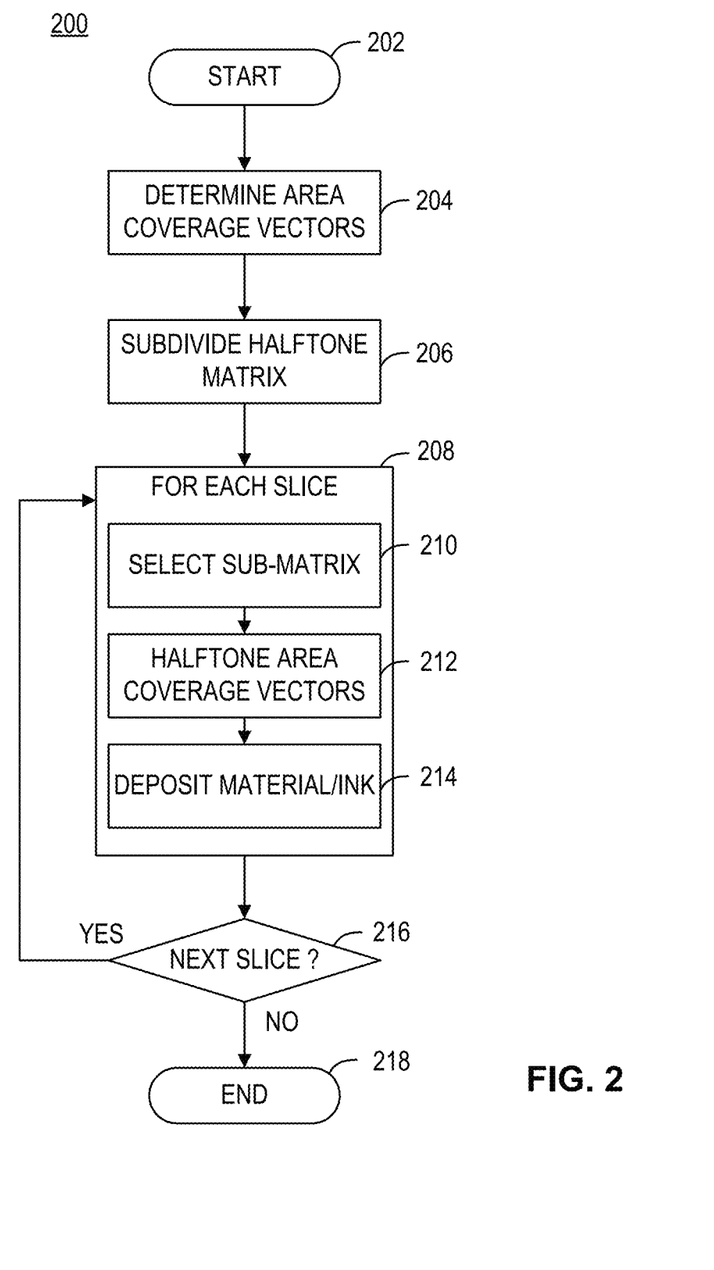
FIG. 2 shows another flow chart directed at a method for rapid prototyping of an object from a digital representation according to one example.

FIG. 2 shows a flow-chart of a method for producing an object from a digital representation of the object according to one example.

The method 200 may start in item 202 and may determine area coverage vectors for each pixel on each slice of the digital representation or model of the object in item 204. The area coverage vectors can be vectors having one element only, which may identify the amount or probability of a single ink/material to be deposited at a particular location. For example, a material vector [X] may indicate that X % of ink/material are to be deposited or that ink/material is deposited with a probability of X. However, the area coverage vector may also comprise multiple components for inks/materials A1, A2, . . . and/or their overprint combinations, such as respective Neugebauer Primaries, and a material vector [X1, X2, . . . , Xm] could be interpreted as X1% of material/ink A1, X2% of material/ink A2, etc, or respective probabilities. Hence, the single ink/material approach can easily be scaled to multiple materials where the sum of Xi is X. The cumulative probability, i.e. the sum of individual components Xi of the multi-material area coverage vector, may be used as a selector in order to determine whether a material and/or ink is printed or not. This can be achieved by using the sub-matrices of the halftone matrix regardless of a number of materials and/or inks. Hence, all materials/inks are halftoned in a single operation.

Multiple materials/inks could be, for example, used to provide 3D prints with different colors, where a "3D location+color to material/ink area coverage" mapping could be used to map to an appropriate mix of colored inks. For example, some C/M/Y-ink combination composed ink area coverage could be gradually increased closer to an edge of an object in order to achieve a desired color at a given location of the object.

The method 200 may proceed with item 206, wherein a two-dimensional halftone matrix including threshold values may be sub-divided into a plurality of sequentially arranged sub-matrices of the same size as the halftone matrix, each sub-matrix including threshold values of the halftone matrix in a respective value sub-range. The sub-matrices may be arranged according to a sequential arrangement of the value sub-ranges which could be, for example, disjoint or overlapping sub-ranges of equal size or varying sizes.

The method may proceed with item 208, wherein for each layer of a sequential manufacturing sequence, and a corresponding slice of the representation, items 210, 212, 214 can be performed.

In item 210, a sub-matrix of the plurality of sequentially arranged sub-matrices may be selected based on a number of the slice modulo a total number of the sequentially arranged sub-matrices. Then, in item 212, the area coverage vectors for the slice may be halftoned using respective threshold values of the selected sub-matrix and ink/material may be deposited on the layer according to results of said halftoning of the area coverage vectors in item 214.

In item 216, the method 200 may determine if the current slice has a subsequent slice and may in this case re-iterate items 210, 212, 214. If the current slice is the last slice of the object, the method 200 may end in item 218.

Even though method 200 has been described as a sequence of items, it is to be understood that respective items may be executed in a different order, sequentially, and/or in parallel. Furthermore, not all of the items of method 200 are required in each described example of the present disclosure.

Individual items of method 100 of FIG. 1 and method 200 of FIG. 2 can be implemented according to the following example, which may accept, as input, a representation of an object, including a plurality of raster slices of the object at slices z, $z_1$, $z_2$, ..., and a halftone matrix T, which could be a void-and-cluster matrix having a [0-100] coding. Suppose that an area coverage vector may be defined for every pixel on each slice zi, for example [25% material, 75% leave blank] for a pixel. It is to be understood that other halftone matrices and other varying area coverage vectors with different values per pixel and parameters can be used. The halftone matrix T may have the same size as the individual slices zi such that for every location [x, y] in a slice zi there may be a corresponding location in the halftone matrix T(x, y).

The 3D halftoning and subsequent additive manufacturing may be implemented according to the following pseudo code:

```
define N sub-ranges and sub-divide the halftone matrix
// slice z will use z * 100/N% range of values modulo N
// e.g. for N == 4, 25% of the range of values will be used by each slice z
// for z == 0 the range is [0-25] (or (z modulo 4) == 0)
// for z == 1 the range is [26-50] (or (z modulo 4) == 1)
// for z == 2 the range is [51-75] (or (z modulo 4) == 2)
// for z == 3 the range is [76-100] (or (z modulo 4) == 3)
// for z == 4, (z modulo 4) == 0 so the sub-range starts over
// hence for z == 4 the range is [0-25]
// ...
for every slice z
for every location [x, y] on slice z
    compare the value of T(x, y) to the area coverage vector at [x, y]:
    // for a sub-division of N == 4 sub-ranges:
    if [T(x, y) > 25 * (z modulo 4)] & [T(x, y) <= 25 * ((z modulo 4) + 1)]
    // e.g. if T(x, y) at slice z == 1 is anywhere between [26 to 50]
        place material into halftone pixel H(x, y) at slice z
    else
    // e.g. if T(x, y)at slice z == 1 is anywhere outside of [26 to 50]
        leave halftone pixel H(x, y) blank
end
end
output halftone (H)
```

Methods 100 and/or 200 can be implemented on a processor or processing component of a 3D printing device in software or as dedicated hardware.

Furthermore, methods 100 and/or 200 as well examples of the present disclosure can be provided as a computer-readable medium having instructions stored thereon, wherein said instructions, in response to execution by a processor, cause said processor to perform the respective method according to one example of the present disclosure.

Figure 3:
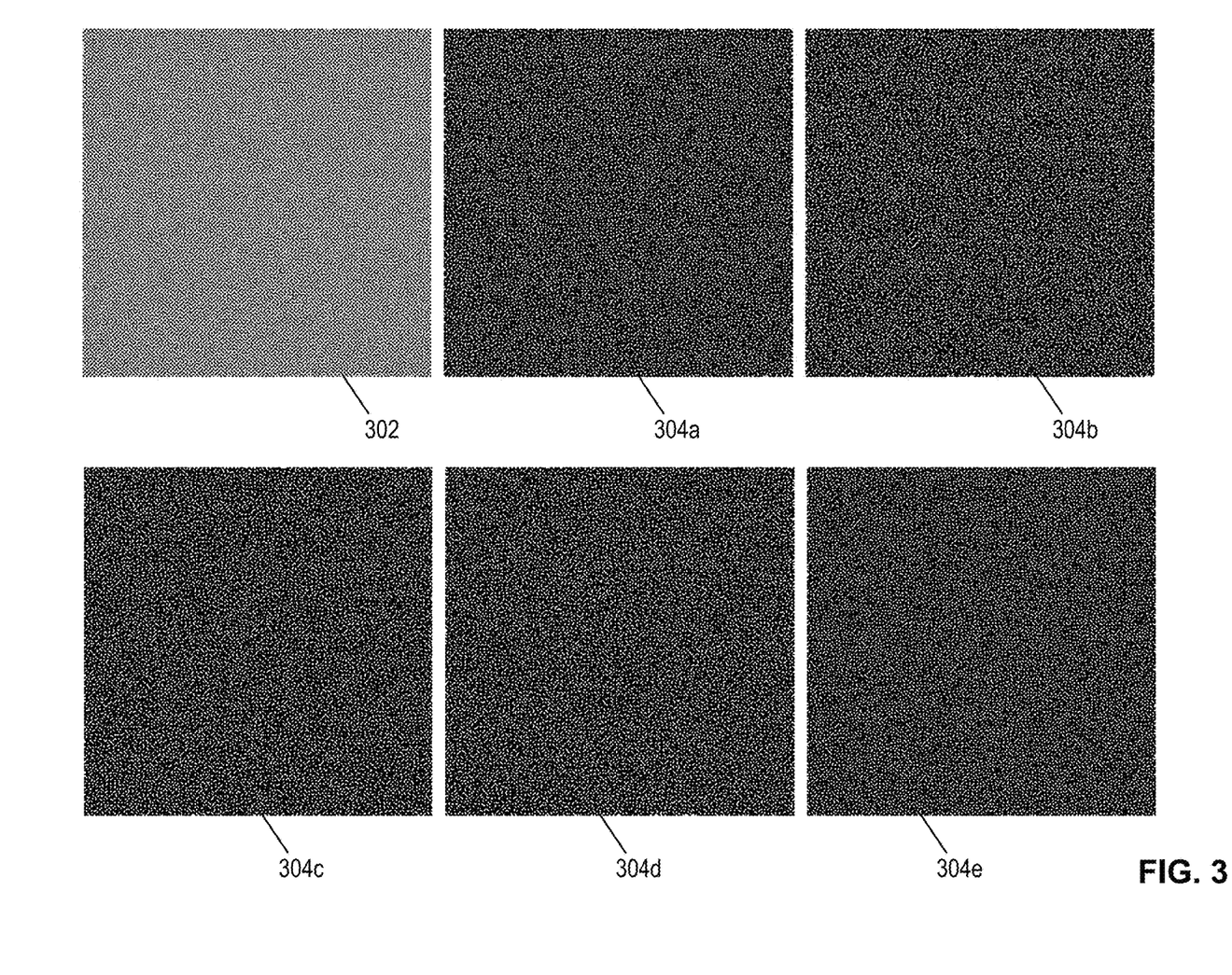
FIG. 3 illustrates values of a halftone matrix and subdivisions of the halftone matrix according to one example.

FIG. 3 shows a halftone matrix and several sub-matrices according to one example. Halftone matrix 302 may be a representation of a void-and-cluster matrix, which may be tuned for a noise with minimal low frequency components and no concentrated spikes in energy, such as blue noise, and sub-matrices 304a, ..., 304e may represent results of a sub-division of the halftone matrix 302 into five sub-ranges, each spanning 20% of the range of the halftone matrix 302. For example, the matrix 302 and the sub-matrices 304a, ..., 304d may be 1024×1024 matrices at 12 bits. Accordingly, halftone matrix 302 may include values in a range from 1 to 4095, matrix 304a may include values from 1 to 819, matrix 304b values from 820 to 1638, matrix 304c values from 1639 to 2457, matrix 304d values from 2458 to 3276, and matrix 304e values from 3277 to 4095. In FIG. 3, sub-matrices 304a, ..., 304e are shown in binary form wherein if the respective matrix comprises a value from matrix 202, the pixel is black and otherwise it is white. As can be seen there are differences in patterns between the slices which allows for improved structural properties of the resulting manufactured or printed 3D object. Halftone matrix 302 may be applied in examples of the present disclosure, such as in method 100 of FIG. 1 and method 200 of FIG. 2, and sub-matrices 304a, ..., 304e may be results of corresponding processing, such as items 106 and 206 of FIGS. 1 and 2, respectively.

Figure 4A:
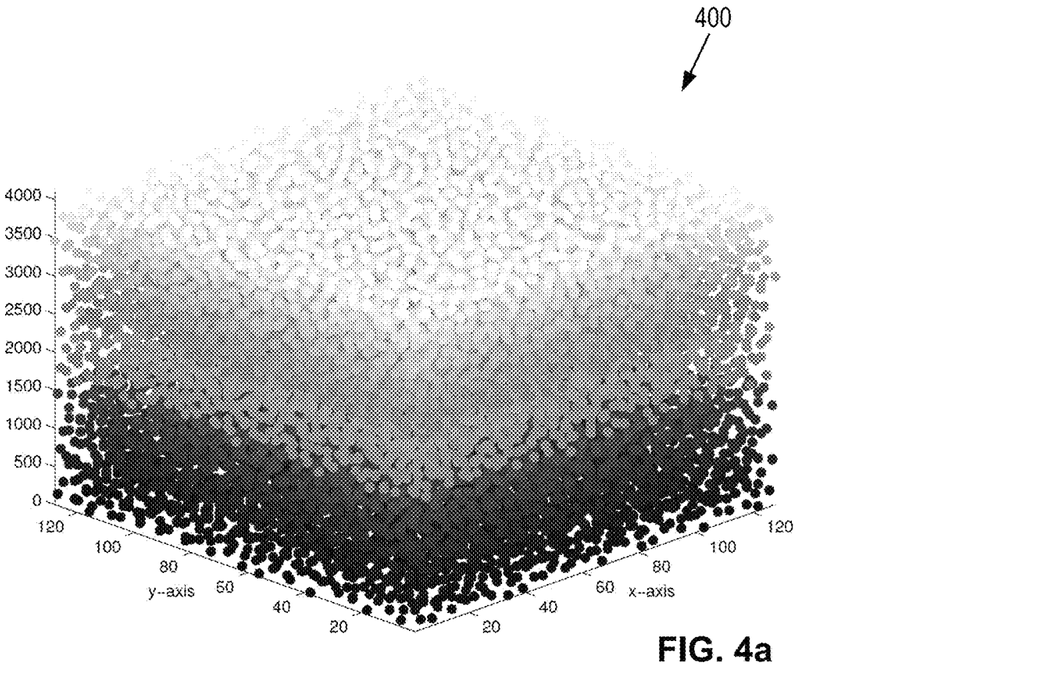
FIGS. 4a and 4b show a representation of values of a sub-divided matrix according to yet another example.
Figure 4B:
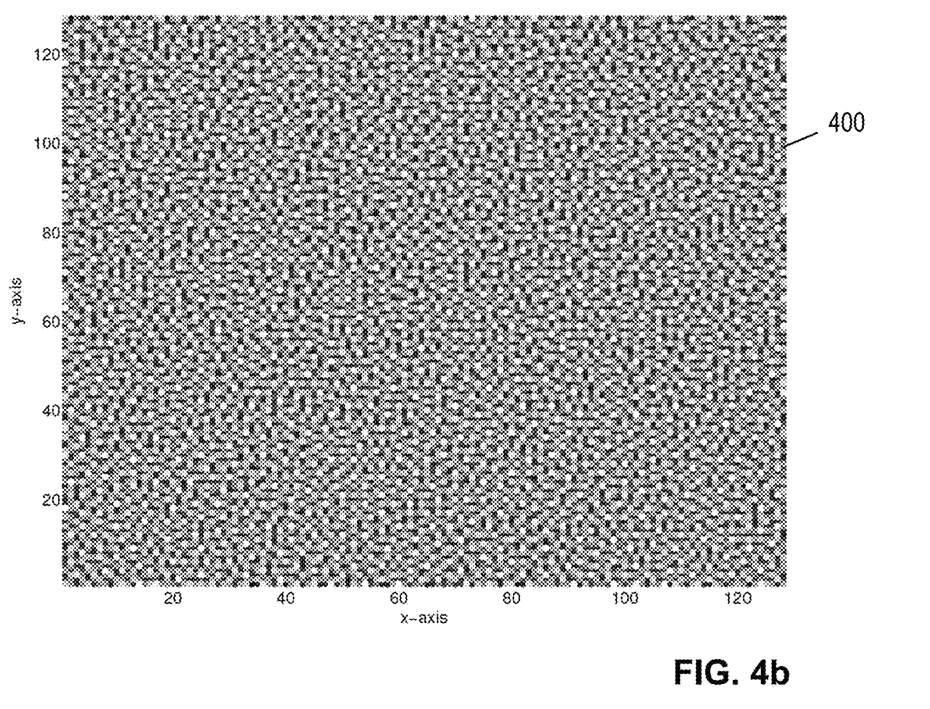

FIGS. 4a and 4b show different views of a halftone matrix and respective sub-ranges according to one example. The represented values may correspond to the values of the halftone matrix 302 of FIG. 3.

FIG. 4a shows a 3D representation of the halftone matrix 400, wherein the values are plotted against a z-axis showing both, an expansion of the halftone matrix in 3D and a visualization of a choice of individual sub-ranges leading to individual sub-matrices, which may be the same sub-ranges and sub-matrices as shown in FIG. 3.

The z-axis may correspond to a z-axis of layers in print, however, modulo the number of sub-matrices such that the representation in FIG. 4a would be for a 3D print of five layers. Hence, the value of the z-axis does not represent the layers in print, but represents the values of the halftone matrix, which are sub-divided into respective sub-ranges, thereby leading to individual sub-matrices. For example, for a first slice, values in the range of 1 to 819, for a second slice, values in the range of 820 to 1638, etc. would be used if a sub-division in N=5 sub-ranges at a granularity of 12 bit is used, in order to halftone a representation of a 3D object.

FIG. 4b corresponds to the view of FIG. 4a projected on the x-y-plane in order to demonstrate the complementarity of the sub-ranges and respective sub-matrices.

The size of the halftone matrix, which corresponds to the granularity and the range of the halftone matrix, may directly relate to the complementarity of levels at subsequent slices. For example, if it is useful to have complementarity over a small number of slices it is sufficient for the halftone matrix to have a size and granularity which covers the number of subsequent slices and then repeat the processing with the halftone matrix. Also, it is to be understood that larger halftone matrices can be constructed. In this regard, the size of the halftone matrix may be directly related to the bit-depth of the matrix, such as 8 bit, 10 bit, 12 bit etc.

The 3D halftoning approaches and printing systems according to examples of the present disclosure define a general framework that allows for any 2D halftone matrix design to be used in three dimensions. The approach can run at high speed since it requires no error-diffusion but operates on an element or pixel basis. The approach lends itself naturally to both variable material/ink proportions used within a single slice and from slice to slice, which may be expressed as material area coverage vectors, for example, based on Neugebauer Primaries. The approach is also applicable in multi-ink 3D color printing by means of ink or area coverage vectors that may vary again both within a slice and between slices.

While examples have been described with varying sizes and granularity of halftone matrices and sub-divisions into specific numbers of sub-matrices, it is to be understood that the disclosure is not limited in this regard and other values and parameters can be used. While some examples have been described in detail it is to be understood that the aspects of the disclosure can take many forms. In particular, the examples may be practiced or implemented differently and the described features and characteristics may be practiced or implemented in any combination.

The invention claimed is:

1. A method comprising:
   determining, by a processor, area coverage vectors for each pixel on each slice of a digital representation of an object;
   subdividing, by the processor, a two-dimensional halftone matrix including threshold values into a plurality of sub-matrices, each sub-matrix including threshold values of the halftone matrix in a respective value sub-range; and
   for each of the slices,
      selecting, by the processor, a sub-matrix of the plurality of sub-matrices; and
      halftoning, by the processor, the area coverage vectors for the pixels in the slice using respective threshold values of the selected sub-matrix.

2. The method of claim 1, further comprising:
   depositing material on a layer according to results of the halftoning of the area coverage vectors for the pixels in the slice.

3. The method of claim 2, wherein depositing material further comprises depositing a build material or printing fluid.

4. The method of claim 1, wherein subdividing the two-dimensional halftone matrix further comprises subdividing the two-dimensional halftone matrix into a plurality of sub-matrices of a same size as the two-dimensional halftone matrix.

5. The method of claim 1, wherein subdividing the two-dimensional halftone matrix further comprises subdividing the two-dimensional halftone matrix into a plurality of sequentially arranged sub-matrices.

6. The method of claim 1, wherein selecting the sub-matrix for each of the slices further comprises selecting the sub-matrix for a slice based on a number of the slice modulo a total number of the sequentially arranged sub-matrices.

7. The method of claim 1, further comprising:
   partitioning a range of the threshold values into a plurality of equal and disjoint sub-ranges.

8. A system comprising:
   a processor; and
   a computer-readable medium on which is stored instructions that when executed by the processor, are to cause the processor to:
      determine area coverage vectors for each pixel on each slice of a digital representation of an object;
      subdivide a two-dimensional halftone matrix including threshold values into a plurality of sub-matrices, each sub-matrix including threshold values of the halftone matrix in a respective value sub-range; and
      for each of the slices,
         select a sub-matrix of the plurality of sub-matrices; and
         halftone the area coverage vectors for the pixels in the slice using respective threshold values of the selected sub-matrix.

9. The system of claim 8, wherein the instructions are further to cause the processor to:
   deposit material on a layer according to results of the halftoning of the area coverage vectors for the pixels in the slice.

10. The system of claim 9, wherein the material comprises a build material or printing fluid.

11. The system of claim 8, wherein to subdivide the two-dimensional halftone matrix, the instructions are further to cause the processor to:
    subdivide the two-dimensional halftone matrix into a plurality of sub-matrices of a same size as the two-dimensional halftone matrix.

12. The system of claim 8, wherein to subdivide the two-dimensional halftone matrix, the instructions are further to cause the processor to:
    subdivide the two-dimensional halftone matrix into a plurality of sequentially arranged sub-matrices.

13. The system of claim 8, wherein to select the sub-matrix for each of the slices, the instructions are further to cause the processor to:
    select the sub-matrix for a slice based on a number of the slice modulo a total number of the sequentially arranged sub-matrices.

14. A non-transitory computer-readable medium on which is stored instructions that when executed by a processor, cause the processor to:
    determine area coverage vectors for each pixel on each slice of a digital representation of an object;
    subdivide a two-dimensional halftone matrix including threshold values into a plurality of sequentially arranged sub-matrices of a same size as the two-dimensional halftone matrix, each sub-matrix including threshold values of the halftone matrix in a respective value sub-range; and
    for each of the slices,
       select a sub-matrix of the plurality of sequentially arranged sub-matrices;
       halftone the area coverage vectors for the pixels in the slice using respective threshold values of the selected sub-matrix; and
       deposit material on a layer according to results of the halftoning of the area coverage vectors for the pixels in the slice.

15. The computer-readable medium of claim 14, wherein the instructions are further to cause the processor to:
    select the sub-matrix for a slice based on a number of the slice modulo a total number of the sequentially arranged sub-matrices.

* * * * *